United States Patent
Li et al.

(10) Patent No.: US 11,323,213 B2
(45) Date of Patent: May 3, 2022

(54) RADIO ACCESS NETWORK NODE, WIRELESS DEVICES, METHODS AND SOFTWARE FOR DEVICE-TO-DEVICE COMMUNICATION

(71) Applicant: Telefonaktiebolaget LM Ericsson (publ), Stockholm (SE)

(72) Inventors: Jingya Li, Gothenburg (SE); Hieu Do, Järfälla (SE); Mikael Fallgren, Kista (SE); Gabor Fodor, Hässelby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 34 days.

(21) Appl. No.: 16/760,748

(22) PCT Filed: Nov. 10, 2017

(86) PCT No.: PCT/SE2017/051119
§ 371 (c)(1),
(2) Date: Apr. 30, 2020

(87) PCT Pub. No.: WO2019/093934
PCT Pub. Date: May 16, 2019

(65) Prior Publication Data
US 2020/0295887 A1    Sep. 17, 2020

(51) Int. Cl.
*H04L 1/18* (2006.01)
*H04W 76/14* (2018.01)
(Continued)

(52) U.S. Cl.
CPC .............. *H04L 1/1896* (2013.01); *H04W 4/70* (2018.02); *H04W 72/042* (2013.01); *H04W 76/14* (2018.02)

(58) Field of Classification Search
CPC ... H04W 28/04; H04W 72/04; H04W 72/042; H04W 88/08; H04W 4/70; H04W 76/14; H04L 5/0007; H04L 1/1896
(Continued)

(56) References Cited

U.S. PATENT DOCUMENTS 5,202,831 A * 4/1993 Blackburn ........... B60N 2/0276
                                                                180/282
5,563,608 A * 10/1996 Tachita .................. G01C 21/30
                                                              342/357.28
(Continued)

FOREIGN PATENT DOCUMENTS

CN  WO 2016/131344 A1 *  8/2016 ........... H04L 1/1819
JP  WO 2016/076301 A1 *  5/2016 ............ H04W 72/04
(Continued)

OTHER PUBLICATIONS

3GPP TSG RAN WG1 Meeting #77, Seoul, Korea, May 19-May 23, 2014, R1-142293, Agenda item: 6.2.5.2.2, Source: Institute of Information Industry (III), Title: Resource allocation scheme for in-coverage D2D communication to support Mode 1 and Mode 2. (Year: 2014).*
(Continued)

*Primary Examiner* — Peter G Solinsky
*Assistant Examiner* — Sanjay K Dewan
(74) *Attorney, Agent, or Firm* — Christopher & Weisberg, P.A.

(57) ABSTRACT

In wireless device-to-device, D2D, communication data are transmitted directly from a first wireless device to a second wireless device. In response to the direct transmission of data, the second wireless device transmits feedback data indicating at least one quality of the data received in the second wireless device. More precisely, according to the invention, a radio access network node controls the direct
(Continued)

transmission of data by means of downlink control information to the first and second wireless devices, and the feedback data are received in the radio access network node. The radio access network node preferably also uses the received feedback to control at least one of the first and second wireless devices.

13 Claims, 6 Drawing Sheets

(51) Int. Cl.
*H04W 4/70* (2018.01)
*H04W 72/04* (2009.01)

(58) Field of Classification Search
USPC ........................................................ 370/329
See application file for complete search history.

(56) References Cited

U.S. PATENT DOCUMENTS

| | | | |
|---|---|---|---|
| 9,515,800 B2 | 12/2016 | Lim et al. | |
| 2010/0069082 A1* | 3/2010 | Kim ................... | H04B 7/15507 455/452.2 |
| 2012/0237086 A1* | 9/2012 | Kourogi .................. | G01S 11/12 382/103 |
| 2014/0064203 A1* | 3/2014 | Seo ....................... | H04L 1/1854 370/329 |
| 2014/0286293 A1* | 9/2014 | Jang ...................... | H04L 5/0051 370/329 |
| 2014/0358840 A1* | 12/2014 | Tadic .................. | B60R 21/0136 706/52 |
| 2015/0016410 A1* | 1/2015 | Lee ...................... | H04L 1/1896 370/330 |
| 2015/0163821 A1 | 6/2015 | Wu | |
| 2015/0358888 A1* | 12/2015 | Gulati ................... | H04W 40/10 370/329 |
| 2016/0019797 A1* | 1/2016 | Klang .................. | G08G 5/0052 701/3 |
| 2016/0057761 A1* | 2/2016 | Panaitopol ............ | H04W 76/14 370/329 |
| 2017/0208638 A1* | 7/2017 | Baghel ................ | H04W 52/383 |
| 2017/0347394 A1 | 11/2017 | Yasukawa et al. | |
| 2018/0290747 A1* | 10/2018 | Chakravarthy ...... | G05D 1/0011 |
| 2019/0187267 A1* | 6/2019 | Li ........................... | G01S 7/292 |
| 2019/0187269 A1* | 6/2019 | Tong ..................... | G01S 13/865 |

FOREIGN PATENT DOCUMENTS

| | | |
|---|---|---|
| WO | 2014143453 A1 | 9/2014 |
| WO | 2016076301 A1 | 5/2016 |
| WO | 2016131344 A1 | 8/2016 |

OTHER PUBLICATIONS

3GPP TSG-RAN WG1 Meeting #73, Fukuoka, Japan, May 20-24, 2013, R1-132188, Agenda Item: 6.2.7.4, Source: InterDigital, Title: D2D Communication in LTE. (Year: 2013).*
International Search Report and Written Opinion dated Aug. 27, 2018 for International Application No. PCT/SE2017/051119 filed on Nov. 10, 2017, consisting of 13—pages.
3GPP TSG RAN WG1 Meeting #77 R1-142293; Title: Resource allocation scheme for in-coverage D2D communication to support Mode 1 and Mode 2; Agenda Item: 6.2.5.2 2; Source: Institute for Information Industry (III); Document for: Discussion/Decision; Location and Date: Seoul, Korea May 19-23, 2014, consisting of 6—pages.
EPO Communication and Supplementary Search Report dated May 28, 2021 for Patent Application No. 17931160.0, consisting of 7—pages.
3GPP TSG-RAN WG1 Meeting #73 R1-132188; Title: D2D Communication in LTE; Agenda Item: 6.2.7.4; Source: InterDigital: Document for: Discussion; Date and Location: May 20-24, 2013, Fukuoka, Japan, consisting of 7—pages.

* cited by examiner

RADIO ACCESS NETWORK NODE, WIRELESS DEVICES, METHODS AND SOFTWARE FOR DEVICE-TO-DEVICE COMMUNICATION

CROSS-REFERENCE TO RELATED APPLICATIONS

This application is a Submission Under 35 U.S.C. § 371 for U.S. National Stage Patent Application of International Application Number: PCT/SE2017/051119, filed Nov. 10, 2017 entitled "RADIO ACCESS NETWORK NODE, WIRELESS DEVICES, METHODS AND SOFTWARE FOR DEVICE-TO-DEVICE COMMUNICATION," the entirety of which is incorporated herein by reference.

TECHNICAL FIELD

Embodiments presented herein relate to a radio access network node, wireless devices, corresponding methods implemented in the radio access network node and the wireless devices, computer programs computer program and products for Device-to-Device Communication.

BACKGROUND

For downlink data transmission in LTE (3rd Generation Partnership Project Long Term Evolution), the base station transceiver eNB (evolved node B) can dynamically adjust the modulation scheme and code rate depending on the estimated downlink channel conditions. This selection process relies on various input parameters, including a channel quality indicator (CQI) feedback provided by the user equipment (UE). The periodicity and frequency resolution of the CQI feedback (i.e. reporting) are controlled by the eNB and can take into account the system bandwidth, UE capabilities and other factors. The CQI report is based on the measured SINR (signal-to-interference-plus-noise ratio) and the characteristics/capabilities of the UE receiver. In addition to CQI reports, further feedback signaling from the UE may include a Precoder Matrix Indicator (PMI) and a Rank Indicator (RI) that help the eNB to adapt the multi-antenna transmission characteristics to the prevailing downlink channel conditions.

In addition to the feedback information included in CQI, PMI and RI, the UE also provides feedback information related to the operation of hybrid automatic repeat request (HARQ) processes in the form of ACK/NACK signaling.

For uplink transmissions, the link adaptation (LA) process is similar to that for the downlink, with the selection of modulation and coding schemes being under the control of the eNB. However, instead of using the CQI feedback, the eNB can make its estimate of the supported uplink data rate based on measurements on uplink reference signals such as the uplink sounding reference signals (SRS).

Other wireless technologies, including code division multiple access and wireless adhoc networks may also use feedback information from the receiver to adapt the transmission power and other characteristics used by the transmitter such that a predefined SINR target is maintained.

Device-to-device (D2D) communications, including unicast support at the physical layer, as an underlay or overlay in cellular networks have been proposed to enhance the spectral and energy efficiency, reduce the latency, and improve the peak rate for devices that are in the proximity of each other. Radio resource management (RRM) schemes for network assisted D2D communications in cellular spectrum aim at taking advantage of the proximity of communicating devices while protecting the cellular layer from harmful interference. In particular, mode selection or "path switching" refers to an RRM scheme that decides whether two or more user equipments that are in the proximity of one another should communicate using a direct link ("D2D mode") or via the cellular infrastructure ("cellular mode").

LTE systems support proximity services by enabling UEs to transmit and receive signals over the sidelink (SL), the so called PC5 interface, which utilizes uplink cellular resources. At present, the LTE SL does not support unicast (point-to-point) communication at the physical layer. This limits the functionality and achievable spectral and energy efficiency of D2D communications.

WO 2016/131344 discloses a D2D solution, which includes methods for sending, receiving, scheduling and corresponding apparatuses. The receiving method comprises: receiving, by a first user equipment, UE1, a D2D data packet sent by a user equipment; verifying, by the UE1, the D2D data packet, and sending, by the UE1, feedback information indicating the verification result. The feedback information is ACK or NACK. If the feedback information is NACK, the UE1 waits for a retransmission of the D2D data packet. The sending method comprises: transmitting, by a second user equipment, UE2, the D2D data packet to the UE1. When the UE2 receives the feedback information sent by the UE1 and the feedback information is NACK, or when the UE2 receives authorization information sent by a device at a network side, re-transmitting, by the UE2, the D2D data packet to the UE1. The scheduling method comprises: sending, by the device at the network side, first authorization information to the UE2, and scheduling, by the device at the network side, the UE2 to send the D2D data packet to the UE1; if the device at the network side receives the feedback information sent by the UE1 and the feedback information is NACK, then sending, by the device at the network side, second authorization information to the UE2, and scheduling, by the device at the network side, the UE2 to retransmit the D2D data packet.

WO 2013/143453 describes an HARQ transmission method, device and system, which are applicable to D2D communications. The method comprises: a first user equipment sending service data to a second user equipment; the first user equipment detecting acknowledgement feedback information and/or authorization information, the feedback information being used for indicating whether the second user equipment has correctly received the service data; and when the acknowledgement feedback information indicates that the second user equipment has not received the service data correctly and/or when it is determined that the authorization information is used for scheduling the first user equipment to perform retransmission of the service data, the first user equipment retransmitting the service data to the second user equipment based on a preset round trip time. By means of the present invention, the problem of HARQ transmission in D2D communications is solved, the compatibility of HARQ transmission when D2D communications and cellular communications coexist is achieved, and the transmission reliability in a communications system where D2D and cellular coexist is guaranteed.

U.S. Pat. No. 9,515,800 shows a method for transmitting feedback information on D2D transmission data in a wireless communication system for supporting D2D communication. The method comprises the steps of: informing a D2D link with another D2D terminal through a D2D terminal search; enabling a first D2D terminal to receive, in the formed D2D link, D2D information including resource allocation information for transmitting D2D data from a base station; enabling the first D2D terminal to receive data from a linked second D2D terminal through a resource according to the resource allocation information; and transmitting, to the base station, feedback information including ACK/NACK signals for the received data, wherein the feedback information can comprise a D2D indicator for indicating the information related to the D2D communication and the identification information of the first D2D terminal and/or the identification information of the second D2D terminal.

US 2015/0163821 reveals a method of handling device-to-device communication for a user equipment of a wireless communication system. The method comprises, during a period of transmission of a first plurality of data blocks, periodically triggering at least one feedback request with a predetermined period, and transmitting a second plurality of data blocks only after receiving at least one feedback in response to the at least one feedback request from at least one other UE.

US 2015/0358888 describes a method, an apparatus, and a computer program product for wireless communication. The apparatus may be a wireless communication user equipment. The apparatus transmits information in a D2D communication to a second UE, the information indicating whether the second UE should use a direct feedback path to the UE or an indirect feedback path to the UE. The apparatus receives feedback through one of the direct feedback path or the indirect feedback path based on the information indicated in the D2D communication. The apparatus receives a D2D communication from a second UE. The apparatus determines whether to transmit feedback in response to the D2D communication via a direct feedback path to the second UE or via an indirect feedback path to the second UE. The apparatus transmits the feedback in response to the D2D communication in the determined feedback path.

Consequently, solutions are known which support D2D communications in a cellular system, where some, or all, of the communicating UEs are under the coverage of the cellular network. Nevertheless, there is a need to enhance the robustness of the D2D communications against fading, shadowing, changes in the large scale fading between the communicating devices and interference. In particular, there is a need for improved feedback based mechanisms for D2D communication.

SUMMARY

An object of the present invention is therefore to mitigate the above problems and offer more reliable and robust D2D communications in cellular systems.

According to one aspect of the invention, a method of wireless D2D communication involves direct transmission of data from a first wireless device to a second wireless device. The method also involves transmission from the second wireless device of feedback data indicating at least one quality of the direct transmission of data received in the second wireless device. The method is performed by a radio access network node and further involves controlling the direct transmission of data by means of downlink control information to the first and second wireless devices. Specifically, the method involves receiving the feedback data in the radio access network node.

This method is advantageous because, although the payload data is sent directly from one UE to another (and thus a highest possible amount of resources are freed in the cellular system), the cellular system maintains full control over the parameters of the data transmission. This reduces the risk of interference and other undesired effects in the spectrum used by the cellular system.

According to one embodiment of this aspect of the invention, the downlink control information is generated in response to the feedback data. Thereby, for example, transmission resources can be allocated adaptively to enhance the throughput and decrease the latency.

According to another embodiment of this aspect of the invention, the method involves assigning a feedback path for the feedback data from the second wireless device; and sending downlink control information to the second wireless device, which downlink control information specifies the assigned feedback path. As a result, the feedback data can be sent efficiently to the controlling radio access network node.

According to yet another embodiment of this aspect of the invention, the method further involves deriving a velocity vector based on at least two position measurements for each of the first and second wireless devices, and a time elapsed between said at least two position measurements. The velocity vector thus represents a relative velocity between the first and second wireless devices. The feedback path for the feedback data from the second wireless device is then assigned based on the velocity vector, for example aiming at minimizing the risk that the feedback data fail to reach the radio access network node successfully. Conversely, the feedback path can be assigned aiming at improving the likelihood of transmitting the feedback data successfully to the radio access network node. In any case, by such consideration of the mutual speed relationship between the wireless devices, the feedback path can be selected to reduce the risk that one or both of the wireless devices lose contact with the cellular network, or that latencies occur due to handovers which could have been avoided.

According to another aspect of the invention, the object is achieved by a radio access network node for wireless D2D communication involving direct transmission of data from a first wireless device to a second wireless device, and transmission from the second wireless device of feedback data indicating at least one quality of the direct transmission of data received in the second wireless device. The radio access network node contains a wireless output interface and a wireless input interface. The wireless output interface is configured to transmit downlink control information to the first and second wireless devices. The downlink control information controls the direct transmission of data. The wireless input interface is configured to receive the feedback data in the radio access network node, either directly from the second wireless device or via one or more intermediate nodes, e.g. represented by another wireless device.

The advantages of this radio access network node, as well as the preferred embodiments thereof, are apparent from the discussion above with the corresponding method.

According to still another aspect of the invention, the object is achieved by a computer program for wireless D2D communication involving direct transmission of data from a first wireless device to a second wireless device and transmission from the second wireless device of feedback data indicating at least one quality of the direct transmission of data received in the second wireless device. The computer program contains computer code which, when run on a processing circuitry of a radio access network node causes the radio access network node to: control the direct transmission of data by means of downlink control information to the first and second wireless devices; and receive the feedback data in the radio access network node.

The advantages of this computer program, as well as the preferred embodiments thereof and a computer program product containing a computer-readable storage medium storing the computer program, are apparent from the discussion above with the corresponding method.

According to yet another aspect of the invention, the object is achieved by a method of wireless D2D communication involving direct transmission of data from a first wireless device to a second wireless device and transmission from the second wireless device of feedback data indicating at least one quality of the direct transmission of data received in the second wireless device. The method is performed by the first wireless device and involves receiving, from a radio access network node, downlink control information relating to the direct transmission of data from the first wireless device to a second wireless device. The method further involves transmitting data directly to the second wireless device in accordance with the downlink control information.

This method is advantageous because it renders the first wireless device adapted to the proposed method of wireless D2D communication, wherein the radio access network node controls the direct transmission of data by means of downlink control information to the first and second wireless devices, and wherein the feedback data are received in the radio access network node.

According to another aspect of the invention, the object is achieved by a first wireless device for wireless D2D communication involving direct transmission of data from a first wireless device to a second wireless device and transmission from the second wireless device of feedback data indicating at least one quality of the direct transmission of data received in the second wireless device. The first wireless device includes a wireless input interface and a wireless output interface. The wireless input interface is configured to receive from a radio access network node downlink control information relating to the direct transmission of data from the first wireless device to a second wireless device. The wireless output interface is configured to transmit data directly to the second wireless device in accordance with the downlink control information.

The advantages of this wireless device, as well as the preferred embodiments thereof, are apparent from the discussion above with the corresponding method.

According to still another embodiment of this aspect of the invention, the object is achieved by a computer program for wireless D2D communication involving direct transmission of data from a first wireless device to a second wireless device and transmission from the second wireless device of feedback data indicating at least one quality of the direct transmission of data received in the second wireless device. The computer program contains computer code which, when run on a processing circuitry of the first wireless device causes the first wireless device to: be configured to receive, from a radio access network node, downlink control information relating to the direct transmission of data from the first wireless device to a second wireless device; and transmit data directly to the second wireless device in accordance with the downlink control information.

The advantages of this computer program, as well as the preferred embodiments thereof and a computer program product containing a computer-readable storage medium storing the computer program, are apparent from the discussion above with the corresponding method.

According to another aspect the invention, the object is achieved by a method of wireless D2D communication involving direct transmission of data from a first wireless device to a second wireless device and transmission from the second wireless device of feedback data indicating at least one quality of the direct transmission of data received in the second wireless device. The method is performed by the second wireless device and involves receiving, from a radio access network node, downlink control information relating to the direct transmission of data from the first wireless device to the second wireless device. The method further involves receiving data directly from the first wireless device in accordance with the downlink control information; and generating feedback data in response to the received data.

This method is advantageous because it renders the second wireless device adapted to the proposed method of wireless D2D communication, wherein the radio access network node controls the direct transmission of data by means of downlink control information to the first and second wireless devices, and the feedback data are received in the radio access network node.

According to another aspect of the invention, the object is achieved by a second wireless device for wireless D2D communication involving direct transmission of data from a first wireless device to the second wireless device and transmission from the second wireless device of feedback data indicating at least one quality of the direct transmission of data received in the second wireless device. The second wireless device includes wireless input interface and a control unit The wireless input interface is configured to: receive, from a radio access network node, downlink control information relating to the direct transmission of data from the first wireless device to the second wireless device; and receive data directly from the first wireless device in accordance with the downlink control information. The control unit is configured to generate feedback data in response to the received data.

The advantages of this wireless device, as well as the preferred embodiments thereof, are apparent from the discussion above with the corresponding method.

According to yet another aspect of the invention, the object is achieved by a computer program for wireless D2D communication involving direct transmission of data from a first wireless device to a second wireless device and transmission from the second wireless device of feedback data indicating at least one quality of the direct transmission of data received in the second wireless device. The computer program contains computer code which, when run on a processing circuitry of the second wireless device causes the second wireless device to be configured to: receive, from a radio access network node, downlink control information relating to the direct transmission of data from the first wireless device to the second wireless device; receive data directly from the first wireless device in accordance with the downlink control information; and generate feedback data in response to the received data.

The advantages of this computer program, as well as the preferred embodiments thereof and a computer program product containing a computer-readable storage medium storing the computer program, are apparent from the discussion above with the corresponding method.

Further advantages, beneficial features and applications of the present invention will be apparent from the following description and the dependent claims.

BRIEF DESCRIPTION OF THE DRAWINGS

The invention is now to be explained more closely by means of preferred embodiments, which are disclosed as examples, and with reference to the attached drawings.

DETAILED DESCRIPTION

In general, according to the invention, the radio access network node BS fully controls the transmission of data D between a first wireless device UE Tx and a second wireless device UE Rx. The radio access network node BS, however does not handle the data D itself. Instead, the data D is transmitted directly from the first wireless device UE Tx to a second wireless device UE Rx.

The radio access network node BS controls both the transmission and reception of the data D, typically user data, over a so-called sidelink between two devices. The radio access network node BS uses downlink control channels and downlink control information (DCI) delivered to the first and second wireless devices UE Tx and UE Rx respectively to control transmission and reception of data D over the sidelink between the nodes that are represented by the first and second wireless devices UE Tx and UE Rx. The radio access network node BS may for example be a wireless access point, an eNB, a gNB or a control node.

Figure 1:
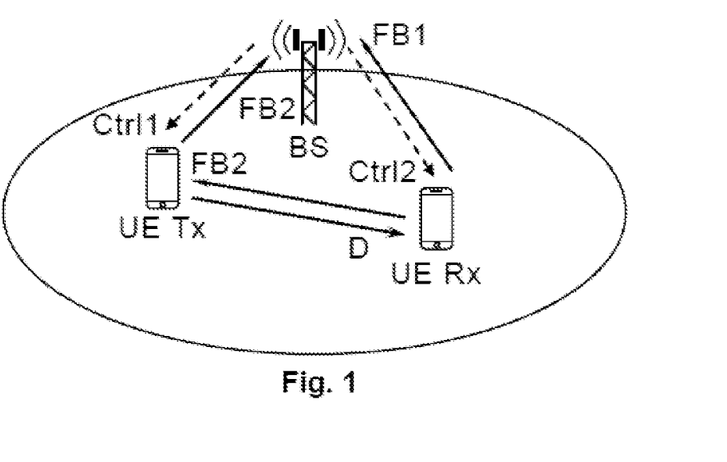
FIG. 1 illustrates a scenario according to a first embodiment of the invention, wherein two wireless devices are controlled by the same radio access network node.

FIG. 1 shows two wireless devices UE Tx and UE Rx, which are controlled by the same radio access network node BS. I.e. both wireless devices UE Tx and UE Rx are within the coverage of the radio access network node BS. Referring to FIG. 1, we will describe a first embodiment of such a centralized control according to the invention.

The proposed wireless D2D communication involves direct transmission of data D from the first wireless device UE Tx to the second wireless device UE Rx and transmission of feedback data FB1 and/or FB2 from the second wireless device UE Rx. The feedback data FB1 and FB2 indicates at least one quality of the direct transmission of data D being received in the second wireless device UE Rx.

The radio access network node BS controls the direct transmission of data D centrally by means of downlink control information Ctrl1 and Ctrl2 transmitted to the first and second wireless devices UE Tx and UE Rx respectively, and via feedback data FB1 and/or FB2. Therefore, the radio access network node BS also receives the feedback data FB1 and/or FB2.

According to one embodiment of the invention, the radio access network node BS generates the downlink control information Ctrl1 and/or Ctrl2 in response to the feedback data FB1 and/or FB2. This means that, depending on for example ACK/NACK statuses represented by the feedback data FB1 and/or FB2, the radio access network node BS can allocate transmission resources adaptively aiming at enhancing the throughput and decreasing the expected latency.

In FIG. 1, a first feedback path for the feedback data FB1 is represented by a direct link from the second wireless device UE Rx to the radio access network node BS. A second feedback path for the feedback data FB2 uses the first wireless device UE Tx as an intermediate node, i.e. the feedback data FB2 are transmitted via the first wireless device UE Tx to the radio access network node BS.

The second feedback path is either an alternative to the first feedback path, or a parallel path in addition to the first feedback path. Of course, a parallel feedback path improves the likelihood that the feedback data reaches the radio access network node BS successfully, however at the cost of a somewhat increased network load.

According to one embodiment of the invention, the radio access network node BS assigns a feedback path for the feedback data FB1 and/or FB2 from the second wireless device UE Rx by sending downlink control information Ctrl2 to the second wireless device UE Rx, which downlink control information Ctrl2 specifies the assigned feedback path. Naturally, if the assigned feedback path involves the first wireless device UE Tx, the radio access network node BS also sends downlink control information Ctrl2 to the first wireless device UE Tx, so that the first wireless device UE Tx becomes informed about from which node to expect feedback data FB2 to be received, and the (final) destination thereof.

According to one embodiment of the invention, the radio access network node BS derives a velocity vector in connection with assigning feedback paths. More precisely, the radio access network node BS derives the velocity vector based on at least two position measurements for each of the first and second wireless devices UE Tx and UE Rx respectively, and a time elapsed between said at least two position measurements. I.e. an average velocity vector is determined by calculating a distance between two positions and dividing this distance by a corresponding elapsed time. Hence, the velocity vector represents a relative velocity between the first and second wireless devices UE Tx and UE Rx. Based on the velocity vector, in turn, the radio access network node BS assigns the feedback path for the feedback data FB1 and/or FB2 from the second wireless device UE Rx, for instance aiming at minimizing the risk that the feedback data FB1 and/or FB2 fail to reach the radio access network node BS successfully. In other words, the feedback path is assigned at improving the likelihood of transmitting the feedback data FB1 and/or FB2 successfully to the radio access network node BS considering the boundaries of the cell(s) served by the radio access network node(s) involved. In practice, this may mean that, if the second wireless device UE Rx is expected to soon be out of the coverage of the radio access network node BS while the first wireless devices UE Tx is expected to remain within the coverage of the radio access network node BS longer, it may be advantageous to assign a feedback path that involves transmitting the feedback data FB2 via the first wireless devices UE Tx.

Figure 3:
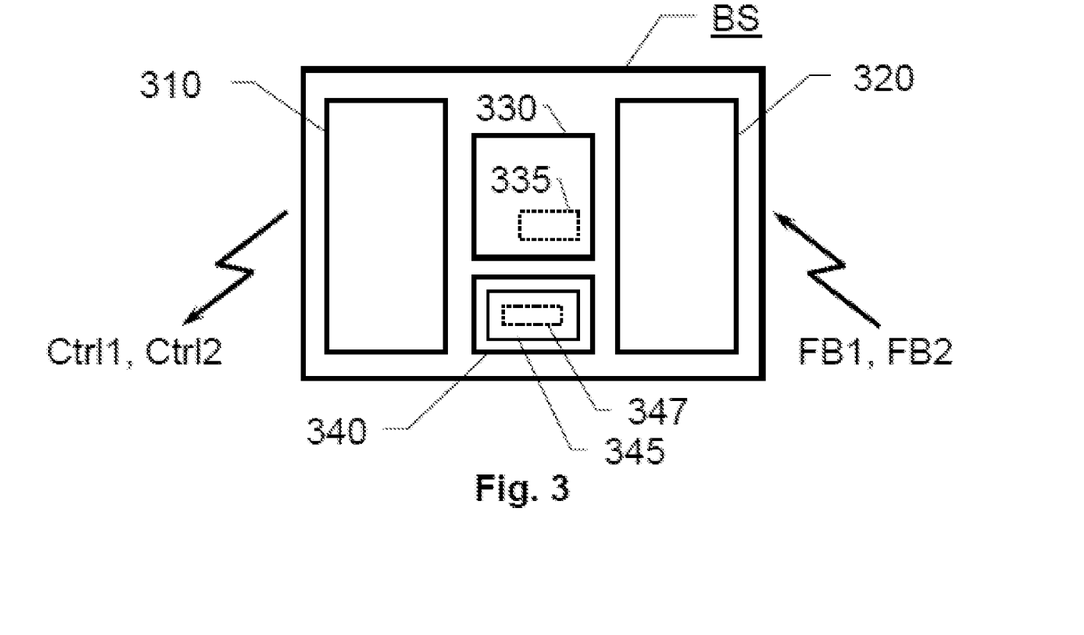
FIG. 3 shows a block diagram over a radio access network node according to one embodiment of the invention.

Referring also to FIG. 3, according to one embodiment of the invention, however, a control unit 330 in the radio access network node BS is configured to determine a magnitude of the velocity vector. If the magnitude of the velocity vector exceeds a threshold value, the control unit 330 is configured to assign the feedback path for the feedback data FB1 such that the feedback path includes the radio access network node BS or BS2 to which the second wireless device US Rx is connected.

In general, according to embodiments of the invention, the radio access network node BS preferably uses a combination of measurement reports by the wireless devices UE Tx and UE Rx as well as positioning information signaled by the wireless devices UE Tx and UE Rx to the radio access network node BS to determine one or more feedback paths for the feedback data FB1 and/or FB2 to the radio access network node BS.

Figure 2:
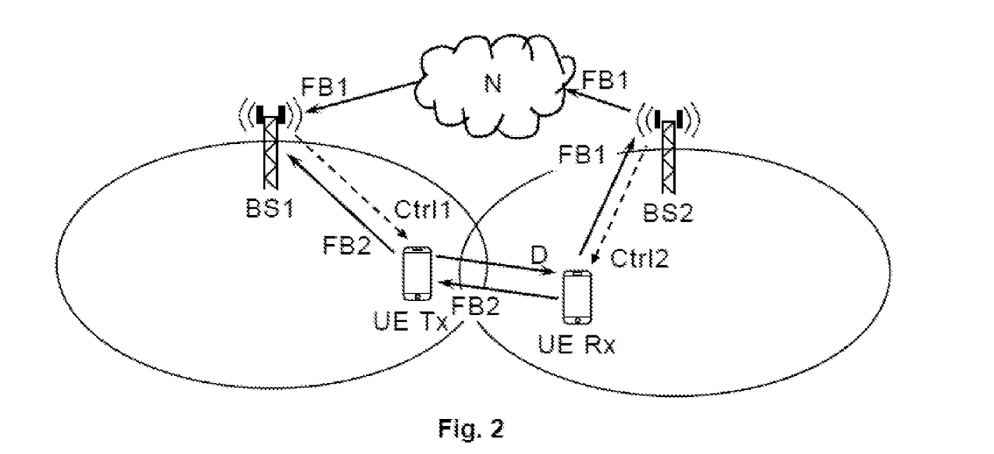
FIG. 2 illustrates a scenario according a second embodiment of the invention, wherein two wireless devices are controlled by two different radio access network nodes.

FIG. 2 illustrates a scenario according a second embodiment of the invention, wherein a first radio access network node BS1 controls a first wireless device UE Tx by means of downlink control information Ctrl1 and a second radio access network node BS2 controls a second wireless device UE Rx by means of downlink control information Ctrl2. The first and second radio access network nodes BS1 and BS2, in turn, are interconnected via at least one network N.

Here, for illustration purposes, we assume that the first radio access network node BS1 is the destination node for the feedback data from the second wireless device UE Rx. Consequently, a first feedback path for the feedback data FB1 can be assigned via the second radio access network node BS2 and the at least one network N to the first radio access network node BS1; and a second feedback path for the feedback data FB2 can be assigned via the first wireless device UR Tx to the first radio access network node BS1.

Naturally, the second radio access network node BS2 may equally well be the destination node for the feedback data from the second wireless device UE Rx. In such a case, a first feedback path (not shown) for the feedback data FB1 could be assigned directly from the second wireless device UE Rx to the second radio access network node BS2; and a second feedback path (not shown) for the feedback data FB2 could be assigned via the first wireless device UE Tx, the first radio access network node BS1 and the at least one network N to the second radio access network node BS2.

FIG. 3 shows a block diagram over a radio access network node BS for wireless D2D communication according to one embodiment of the invention. The radio access network node BS contains a wireless output interface 310 and a wireless input interface 320.

The wireless output interface 310 is configured to transmit downlink control information Ctrl1 and/or Ctrl2 to the first and/or second wireless devices UE Tx and/or UE Rx respectively depending on whether both of them or just one of them are located within the cell operated by the radio access network node BS. Namely, the downlink control information Ctrl1 and Ctrl2 controls the direct transmission of data D in the first and second wireless devices UE Tx and UE Rx respectively.

The wireless input interface 320 is configured to receive the feedback data FB1 and/or FB2 in the radio access network node BS as described above.

According to one embodiment of the invention, the radio access network node BS also includes a control unit 330; which, preferably, among other things, is configured to generate the downlink control information Ctrl1 and/or Ctrl2 in response to the feedback data FB1 and/or FB2.

More precisely, the control unit 330 may be configured to assign a feedback path for the feedback data FB1 and/or FB2 from the second wireless device UE Rx as explained above. If so, the control unit 330 is likewise configured to cause the radio access network node BS to send downlink control information Ctrl2 to the second wireless device UE Rx (and possibly also to send downlink control information Ctrl1 to the first wireless device UE Tx depending on the feedback path), which downlink control information Ctrl2 (and Ctrl1) specifies the assigned feedback path.

According to one embodiment of the invention, the control unit 330 is further configured to derive a velocity vector based on at least two position measurements for each of the first and second wireless devices UE Tx and UE Rx respectively, and a time elapsed between said at least two position measurements. The velocity vector thus derived represents a relative velocity between the first and second wireless devices UE Tx and UE Rx. In other words, the relative velocity vector expresses a magnitude and a direction in two or three dimensions.

Based on the velocity vector, in turn, the control unit 330 is configured to assign at least one feedback path for the feedback data FB1 and/or FB2 from the second wireless device UE Rx. Preferably, here, the feedback path(s) is(are) assigned so that it can be expected that the feedback data FB1 and/or FB2 reaches the intended radio access network node BS before any of the links included in the feedback path(s) is broken.

Figure 4:
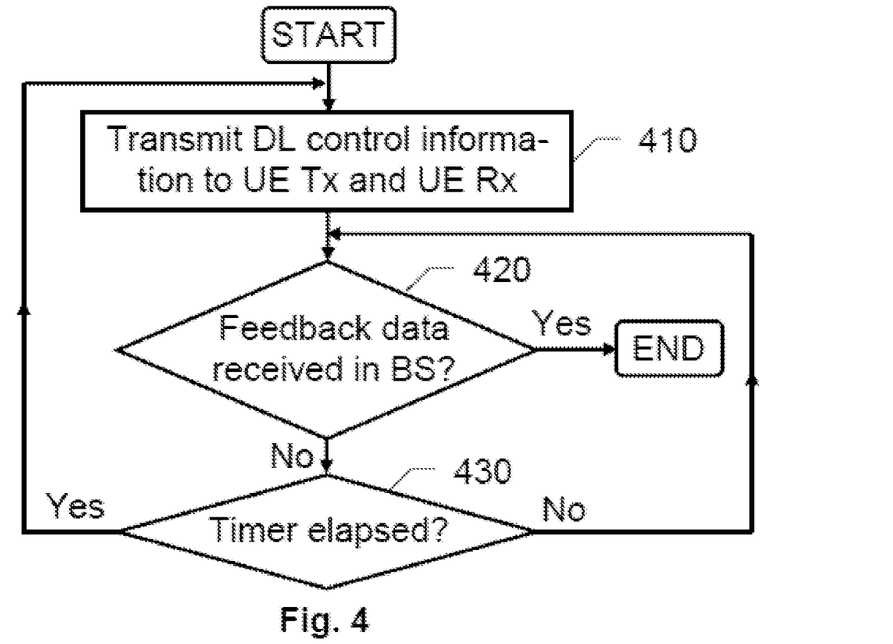
FIG. 4 illustrates, by means of a flow diagram, a method of D2D communication being implemented in a radio access network node according to one embodiment of the invention.

With reference to the flow diagrams in FIG. 4, we will now describe a method of D2D communication being implemented in a radio access network node according to one embodiment of the invention.

In a first step 410, downlink control information Ctrl1 and Ctrl2 is transmitted to the first and second wireless devices UE Tx and UE Rx respectively to control the direct transmission of data D from the first wireless device UE Tx to the second wireless device UE Rx.

A step 420 thereafter, checks if feedback data have been received in the radio access network node in response to the data D. If such feedback data have been received, the procedure ends; and otherwise, a step 430 follows.

Step 430 checks if a timer has elapsed; and if so, the procedure loops back to step 410 for retransmission of the data D (under the presumption that expiration of the timer represents a NACK status). If, however, the timer has not yet elapsed, the procedure loops back and stays in step 420.

Referring again to FIG. 3, a computer program 347 preferably comprises computer code which, when run on a processing circuitry 335 in the control unit 330 of the radio access network node BS causes the radio access network node BS effect the above-described steps.

It is further advantageous if a computer program product 340, in turn, comprises a computer-readable storage medium 345 that stores the computer program 347.

Figure 5:
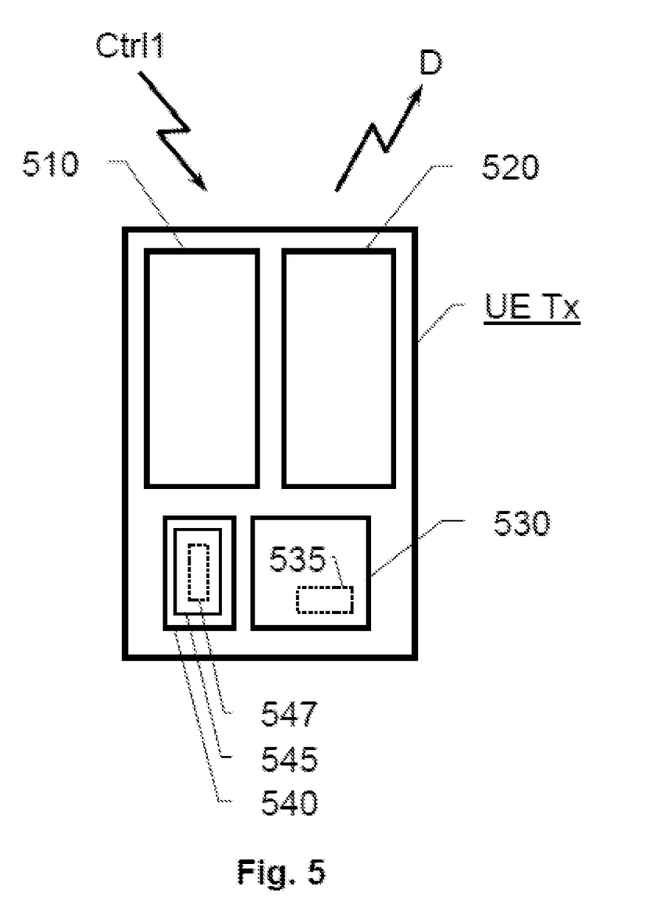
FIG. 5 shows a block diagram over a first wireless device according to one embodiment of the invention.

FIG. 5 shows a block diagram over a first wireless device UE Tx for wireless D2D communication according to one embodiment of the invention. The first wireless device UE Tx contains a wireless input interface 510 and a wireless input interface 520.

The wireless input interface 510 is configured to receive downlink control information Ctrl1 from a radio access network node BS. The downlink control information Ctrl1 relates to the direct transmission of data D from the first wireless device UE Tx to a second wireless device UE Rx.

The wireless output interface 520 is configured to transmit data D directly to the second wireless device UE Rx in accordance with the downlink control information Ctrl1. For example, this means using one or more transmission resources specified in the downlink control information Ctrl1.

According to one embodiment of the invention, the wireless input interface 510 is further configured to receive downlink control information Ctrl1 from the radio access network node BS, which downlink control information Ctrl1 specifies an assigned feedback path for the feedback data FB1 and/or FB2. Since the first wireless device UE Tx is not the destination for the feedback data FB1 and/or FB2, the assigned feedback path involves forwarding feedback data received from the second wireless device UE Rx to the radio access network node BS.

The wireless input interface 510 is also configured to receive the feedback data FB1 and/or FB2 in the first wireless device UE Tx; and analogously, the output interface 520 is configured to forward the feedback data FB2 to the radio access network node BS along the assigned feedback path.

Figure 6:
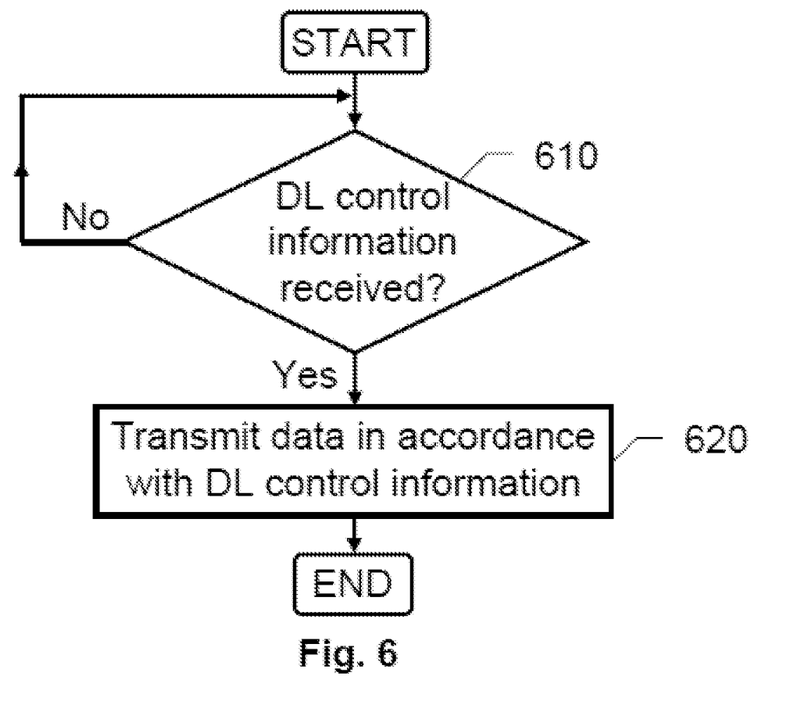
FIG. 6 illustrates, by means of a flow diagram, a method of D2D communication that is implemented in a first wireless device according to one embodiment of the invention.

FIG. 6 illustrates, by means of a flow diagram, a method of D2D communication being implemented in a first wireless device UE Tx according to one embodiment of the invention.

A first step 610 checks if downlink control information Ctrl1 has been received in the first wireless device UE Tx. If no downlink control information Ctrl1 has been received, the procedure loops back and stays in step 610; and otherwise, a step 620 follows in which data D are transmitted directly to a second wireless device UE Rx in accordance with the downlink control information Ctrl1. For example, this means using one or more transmission resources specified in the downlink control information Ctrl1. After step 620, the procedure ends.

Referring again to FIG. 5, a computer program 547 preferably comprises computer code which, when run on a processing circuitry 535 in the control unit 530 of the first wireless device UE Tx causes the first wireless device UE Tx effect to the above-described steps.

It is further advantageous if a computer program product 540, in turn, comprises a computer-readable storage medium 545 that stores the computer program 547.

Figure 7:
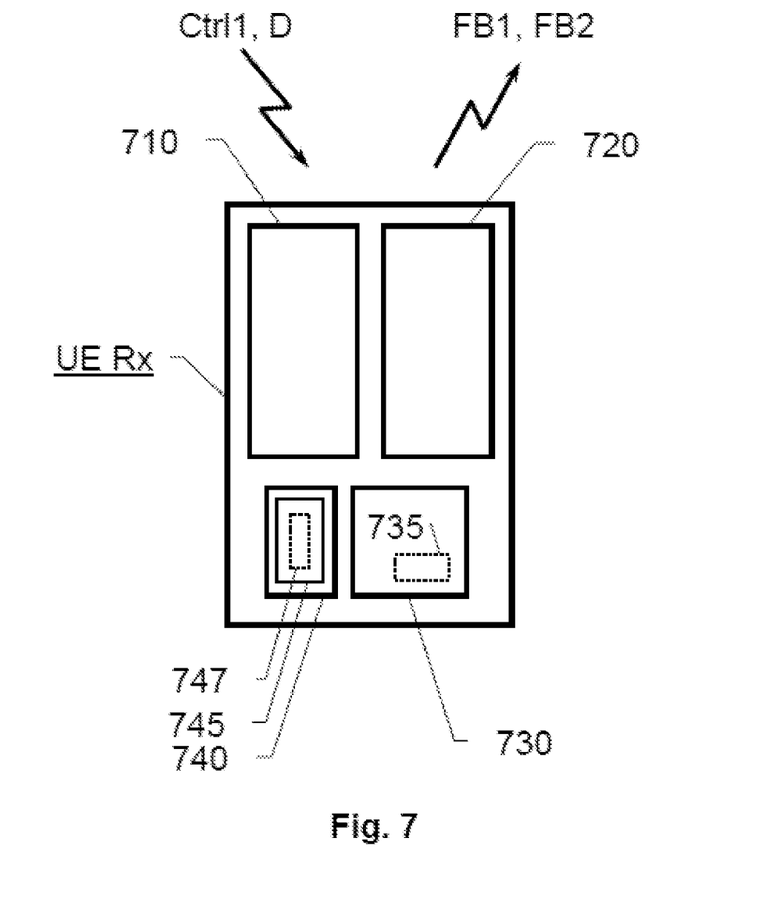
FIG. 7 shows a block diagram over a second wireless device according to one embodiment of the invention.

FIG. 7 shows a block diagram over a second wireless device UE Rx according to one embodiment of the invention. The second wireless device UE Rx contains a wireless input interface 710 and a control unit 730.

The wireless input interface 710 is configured to receive downlink control information Ctrl2 from a radio access network node BS. The downlink control information Ctrl2 relates to the direct transmission of data D from a first wireless device UE Tx to the second wireless device UE Rx. Moreover, the wireless input interface 710 is configured to receive data D directly from the first wireless device UE Tx in accordance with the downlink control information Ctrl1. Preferably, this involves monitoring transmission resources specified by the downlink control information Ctrl2. The control unit 730 is configured to generate feedback data FB1 and/or FB2 in response to the received data D.

According to one embodiment of the invention, the wireless input interface 710 is further configured to receive downlink control information Ctrl2 from the radio access network node BS, which downlink control information Ctrl2 specifies an assigned feedback path for the feedback data FB1 and/or FB2 to the radio access network node BS. Additionally, the second wireless device UE Rx contains a wireless output interface 720 configured to transmit the feedback data FB1 and/or FB2 along the assigned feedback path.

Figure 8:
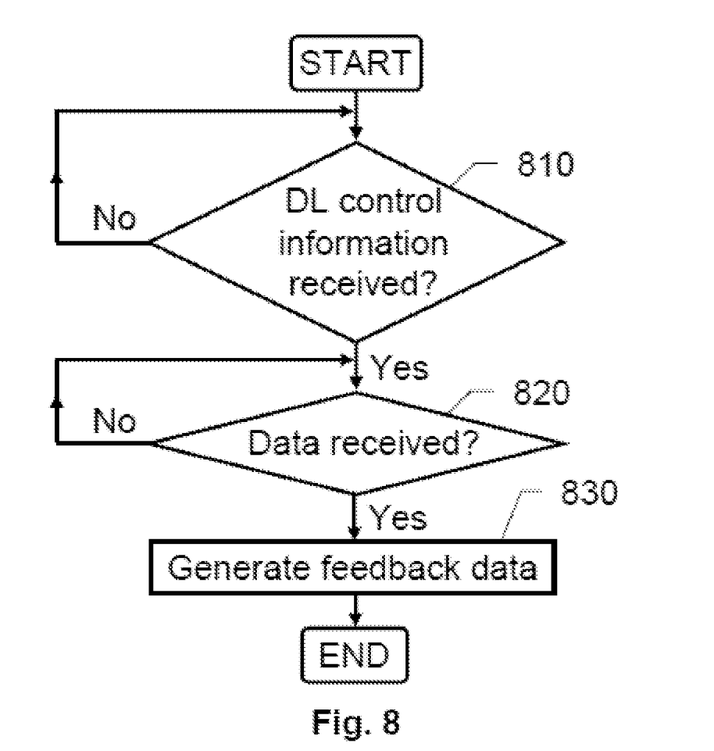
FIG. 8 illustrates, by means of a flow diagram, a method of D2D communication that is implemented in a second wireless device according to one embodiment of the invention.

FIG. 8 illustrates, by means of a flow diagram, a method of D2D communication being implemented in a second wireless device according to one embodiment of the invention.

A first step 810 checks if downlink control information Ctrl2 has been received from a radio access network node BS, which downlink control information Ctrl2 relates to the direct transmission of data D from a first wireless device UE Tx to the second wireless device UE Rx. If no such downlink control information Ctrl2 has been received, the procedure loops back and stays in step 810; and otherwise, a step 820 follows.

In step 820, it is checked if data D have been received directly from the first wireless device UE Tx in accordance with the downlink control information Ctrl1. Preferably; this involves monitoring one or more transmission resources specified by the downlink control information Ctrl2. As long as no data D has been received, the procedure stays in step 820. Subsequently, a step 830 follows in which feedback data are generated in response to the data D. Then, the procedure ends.

Referring again to FIG. 7, a computer program 747 preferably comprises computer code which, when run on a processing circuitry 735 in the control unit 730 of the second wireless device UE Rx causes the second wireless device UE Rx effect to the above-described steps.

It should be noted that, although the first and second wireless devices UE Tx and UE Rx have been described above as two different entities, in practice, however, both devices are preferably implemented in a common apparatus, which may thus act both as a transmitter and a receiver of the data D.

To sum up, all of the process steps of FIGS. 4, 6 and 8 may be effected by means of at least one programmed processor. Moreover, although the embodiments of the invention described above with reference to the drawings comprise processor and processes performed in at least one processor, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The program may either be a part of an operating system, or be a separate application. The carrier may be any entity or device capable of carrying the program. For example, the carrier may comprise a storage medium, such as a Flash memory, a ROM (Read Only Memory), for example a DVD (Digital Video/Versatile Disk), a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

The term "comprises/comprising" when used in this specification is taken to specify the presence of stated features, integers, steps or components. However, the term does not preclude the presence or addition of one or more additional features, integers, steps or components or groups thereof.

The invention is not restricted to the described embodiments in the figures, but may be varied freely within the scope of the claims.

The invention claimed is:

1. A method of wireless device-to-device, D2D, communication involving direct transmission of data from a first wireless device to a second wireless device and transmission from the second wireless device of feedback data indicating at least one quality of the direct transmission of data received in the second wireless device, the method being performed by a radio access network node, and the method comprising:
controlling the direct transmission of data using downlink control information to the first and second wireless devices;
assigning a feedback path for the feedback data from the second wireless device;
sending to the second wireless device downlink control information specifying the assigned feedback path;
receiving the feedback data in the radio access network node; and
generating downlink control information in response to the feedback data.

2. The method according to claim 1, further comprising:
deriving a velocity vector based on at least two position measurements for each of the first and second wireless devices and a time elapsed between said at least two position measurements, the velocity vector representing a relative velocity between the first and second wireless devices, and based on the velocity vector; and
assigning the feedback path for the feedback data from the second wireless device.

3. The method according to claim 2, wherein the feedback path for the feedback data is assigned to minimize risk that the feedback data fail to reach the radio access network node.

4. The method according to claim 3, comprising:
determining a magnitude of the velocity vector, and when the magnitude of the velocity vector exceeds a threshold value:
assigning the feedback path for the feedback data, the feedback path including the radio access network node to which the second wireless device is connected.

5. The method according to claim 2, comprising:
determining a magnitude of the velocity vector, and when the magnitude of the velocity vector exceeds a threshold value:
assigning the feedback path for the feedback data, the feedback path including the radio access network node to which the second wireless device is connected.

6. A radio access network node for wireless device-to-device, D2D, communication involving direct transmission of data from a first wireless device to a second wireless device and transmission from the second wireless device of feedback data indicating at least one quality of the direct transmission of data received in the second wireless device, the radio access network node comprising:
a control unit configured to assign a feedback path for the feedback data from the second wireless device and generate downlink control information in response to the feedback data;
a wireless output interface configured to transmit downlink control information to the first and second wireless devices, the downlink control information controlling the direct transmission of data and specifying the assigned feedback path; and
a wireless input interface configured to receive the feedback data in the radio access network node.

7. A method of wireless device-to-device, D2D, communication involving direct transmission of data from a first wireless device to a second wireless device and transmission from the second wireless device of feedback data indicating at least one quality of the direct transmission of data received in the second wireless device, the method being performed by the first wireless device, the method comprising:
receiving, from a radio access network node, downlink control information relating to the direct transmission of data from the first wireless device to a second wireless device, the downlink control information specifying an assigned feedback path for the feedback data, which assigned feedback path involves forwarding feedback data received from the second wireless device to the radio access network node;
receiving the feedback data in the first wireless device;
forwarding the feedback data to the radio access network node along the assigned feedback path; and
transmitting data directly to the second wireless device in accordance with the downlink control information.

8. A first wireless device for wireless device-to-device, D2D, communication involving direct transmission of data from a first wireless device to a second wireless device and transmission from the second wireless device of feedback data indicating at least one quality of the direct transmission of data received in the second wireless device, the first wireless device comprising:
a wireless input interface configured to:
receive from a radio access network node downlink control information relating to the direct transmission of data from the first wireless device to a second wireless device, the downlink control information specifying an assigned feedback path for the feedback data, which assigned feedback path involves forwarding feedback data received from the second wireless device to the radio access network node;
receive the feedback data in the first wireless device; and
forward the feedback data to the radio access network node along the assigned feedback path; and
a wireless output interface configured to transmit data directly to the second wireless device in accordance with the downlink control information.

9. A method of wireless device-to-device, D2D, communication involving direct transmission of data from a first wireless device to a second wireless device and transmission from the second wireless device of feedback data indicating at least one quality of the direct transmission of data received in the second wireless device, the method being performed by the second wireless device, the method comprising:
receiving, from a radio access network node, downlink control information relating to the direct transmission of data from the first wireless device to the second wireless device, the downlink control information specifying an assigned feedback path for the feedback data to the radio access network node;
transmitting the feedback data to the radio access network node along the assigned feedback path;
receiving data directly from the first wireless device in accordance with the downlink control information; and
generating feedback data in response to the received data.

10. The method according to claim 9, wherein the feedback path involves forwarding the feedback data over at least one radio access network node different from said the radio access network node to the radio access network node.

11. The method according to claim 10, wherein the feedback path involves forwarding the feedback data over the first wireless device to the radio access network node.

12. The method according to claim 9, wherein the feedback path involves forwarding the feedback data over the first wireless device to the radio access network node.

13. A second wireless device for wireless device-to-device, D2D, communication involving direct transmission of data from a first wireless device to the second wireless device and transmission from the second wireless device of feedback data indicating at least one quality of the direct transmission of data received in the second wireless device, the second wireless device comprising:
- a wireless input interface configured to:
    - receive, from a radio access network node, downlink control information relating to the direct transmission of data from the first wireless device to the second wireless device, the downlink control information specifying an assigned feedback path for the feedback data to the radio access network node;
    - transmit the feedback data along the assigned feedback path; and
    - receive data directly from the first wireless device in accordance with the downlink control information; and
- a control unit configured to generate feedback data in response to the received data.

\* \* \* \* \*